(12) United States Patent
Pipkorn et al.

(10) Patent No.: US 6,905,529 B2
(45) Date of Patent: Jun. 14, 2005

(54) WIRE FILTER CAGE

(75) Inventors: Howard Pipkorn, Ham Lake, MN (US); Kal Ugargol, Minneapolis, MN (US)

(73) Assignee: Air Cure, Inc., Minneapolis, MN (US)

( * ) Notice: Subject to any disclaimer, the term of this patent is extended or adjusted under 35 U.S.C. 154(b) by 0 days.

(21) Appl. No.: 10/920,029

(22) Filed: Aug. 17, 2004

(65) Prior Publication Data

US 2005/0034436 A1 Feb. 17, 2005

Related U.S. Application Data

(63) Continuation of application No. 10/645,859, filed on Aug. 21, 2003, now Pat. No. 6,790,250, which is a continuation of application No. 10/037,319, filed on Dec. 31, 2001, now Pat. No. 6,626,970.
(60) Provisional application No. 60/258,674, filed on Dec. 29, 2000, and provisional application No. 60/295,333, filed on Jun. 1, 2001.

(51) Int. Cl.$^7$ .............................................. B01D 46/02
(52) U.S. Cl. ....................... 55/379; 55/341.1; 55/377; 55/378; 55/492; 55/496; 55/507; 55/509; 210/232; 210/323.2; 210/346; 210/486
(58) Field of Search ................................ 55/379, 341.1, 55/377, 378, 492, 496, 507, 509; 210/232, 323.2, 346

(56) References Cited

U.S. PATENT DOCUMENTS

| | | | | |
|---|---|---|---|---|
| 3,680,285 A | * | 8/1972 | Wellan et al. ................ 55/302 |
| 3,747,307 A | * | 7/1973 | Peshina et al. ............... 55/379 |
| 3,884,659 A | * | 5/1975 | Ray ............................. 55/379 |
| 4,141,128 A | * | 2/1979 | Wonderling ............. 29/896.62 |
| 4,158,554 A | * | 6/1979 | Bundy et al. ................. 55/379 |
| 4,220,459 A | * | 9/1980 | Hammond et al. ........ 55/341.1 |
| 4,264,345 A | * | 4/1981 | Miller ....................... 55/341.1 |
| 4,290,790 A | * | 9/1981 | Okubo ........................ 55/379 |
| 4,293,111 A | * | 10/1981 | Henri ........................... 248/95 |
| 4,322,231 A | * | 3/1982 | Hilzendeger et al. ......... 55/357 |
| 4,323,376 A | * | 4/1982 | Rosenquest .................. 55/304 |
| 4,324,571 A | * | 4/1982 | Johnson, Jr. ................. 55/302 |
| 4,336,035 A | * | 6/1982 | Evenstad et al. ............. 95/286 |
| 4,435,197 A | * | 3/1984 | Nijhawan et al. .......... 55/341.7 |
| 4,948,504 A | * | 8/1990 | Kierdorf et al. ............ 210/238 |
| 5,061,303 A | * | 10/1991 | Williams et al. ........... 55/341.1 |
| 5,173,098 A | * | 12/1992 | Pipkorn ....................... 55/379 |
| 5,290,441 A | * | 3/1994 | Griffin et al. ............... 210/232 |
| 5,308,369 A | * | 5/1994 | Morton et al. ................ 55/379 |
| 5,730,766 A | * | 3/1998 | Clements ................... 55/341.1 |
| 5,928,395 A | * | 7/1999 | Glen et al. .................... 55/378 |
| 5,951,726 A | * | 9/1999 | Allingham et al. ........... 55/379 |

* cited by examiner

Primary Examiner—Minh-Chau T. Pham
(74) Attorney, Agent, or Firm—Patterson, Thuente, Skaar & Christensen, P.A.

(57) ABSTRACT

An improved filter support structure for supporting filter media. The support structure includes two sections removably coupled together with an improved coupling assembly. The first section has a cross section presenting a first width spaced apart from a second width, the second width being less than the first width. The coupling assembly includes an element carried by the second section, and presents an engagement width that is greater than the second width and less than or equal to the first width such that the element may be shiftably received within the first section at the first width, and can be removably engaged at the second width.

7 Claims, 9 Drawing Sheets

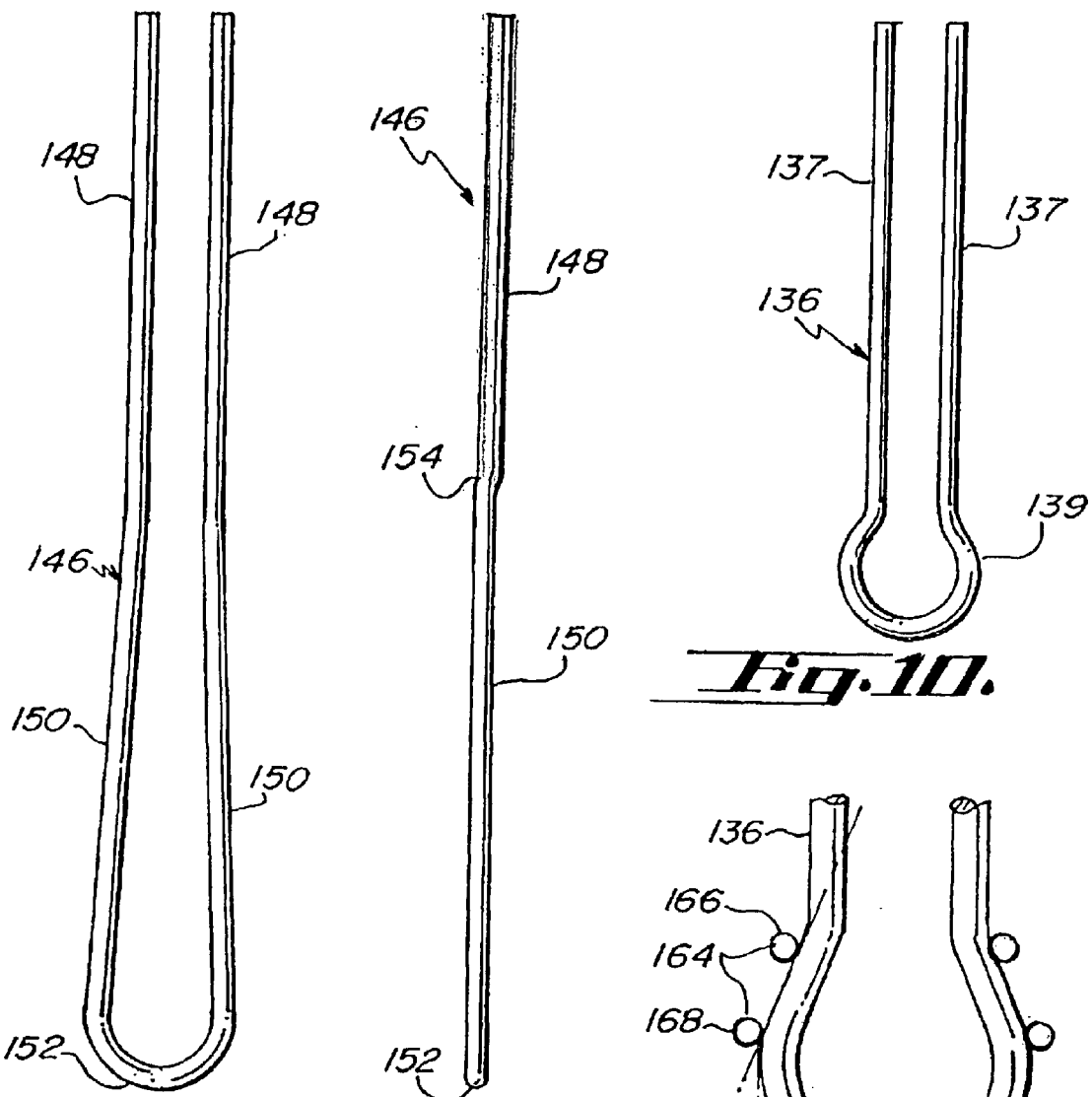
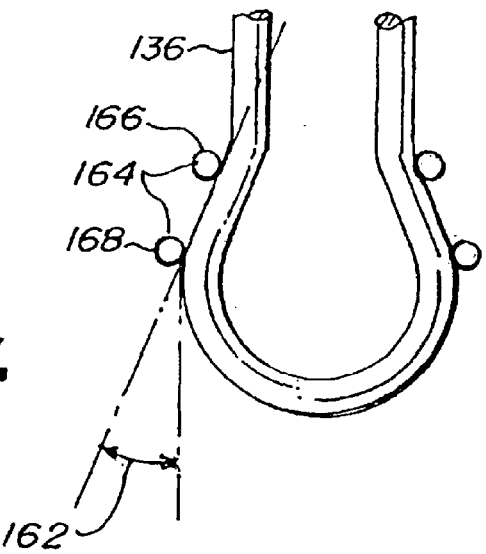
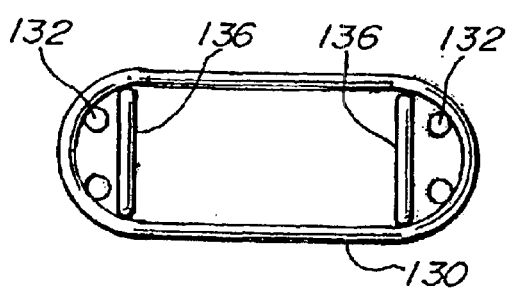

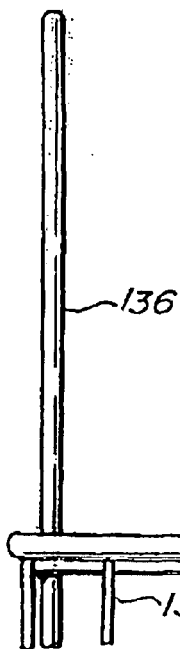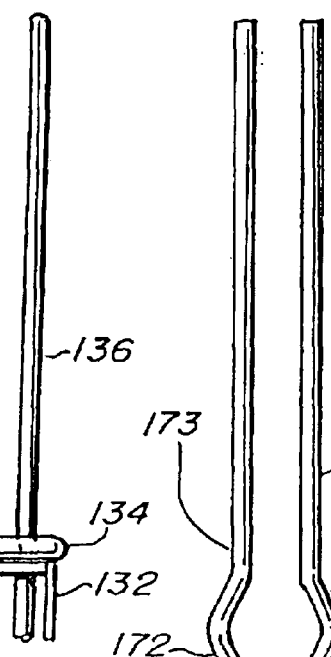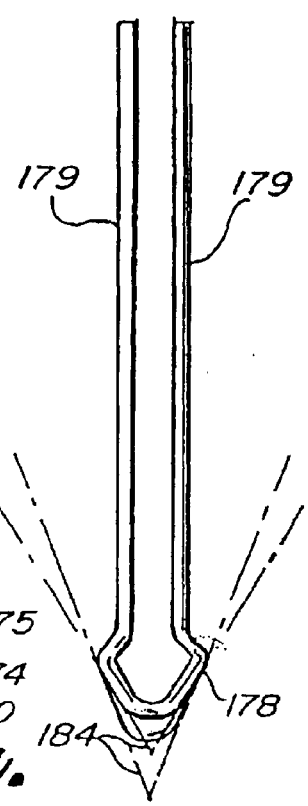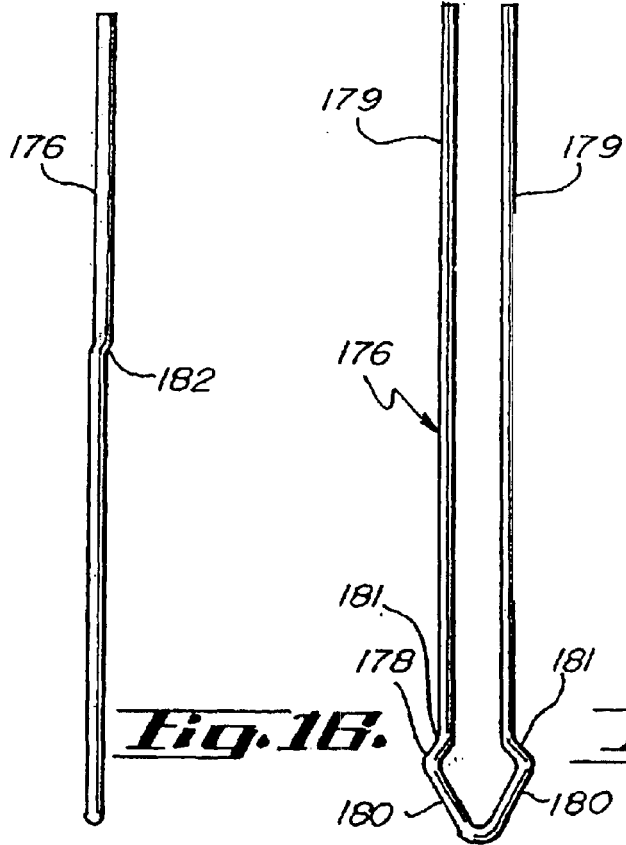

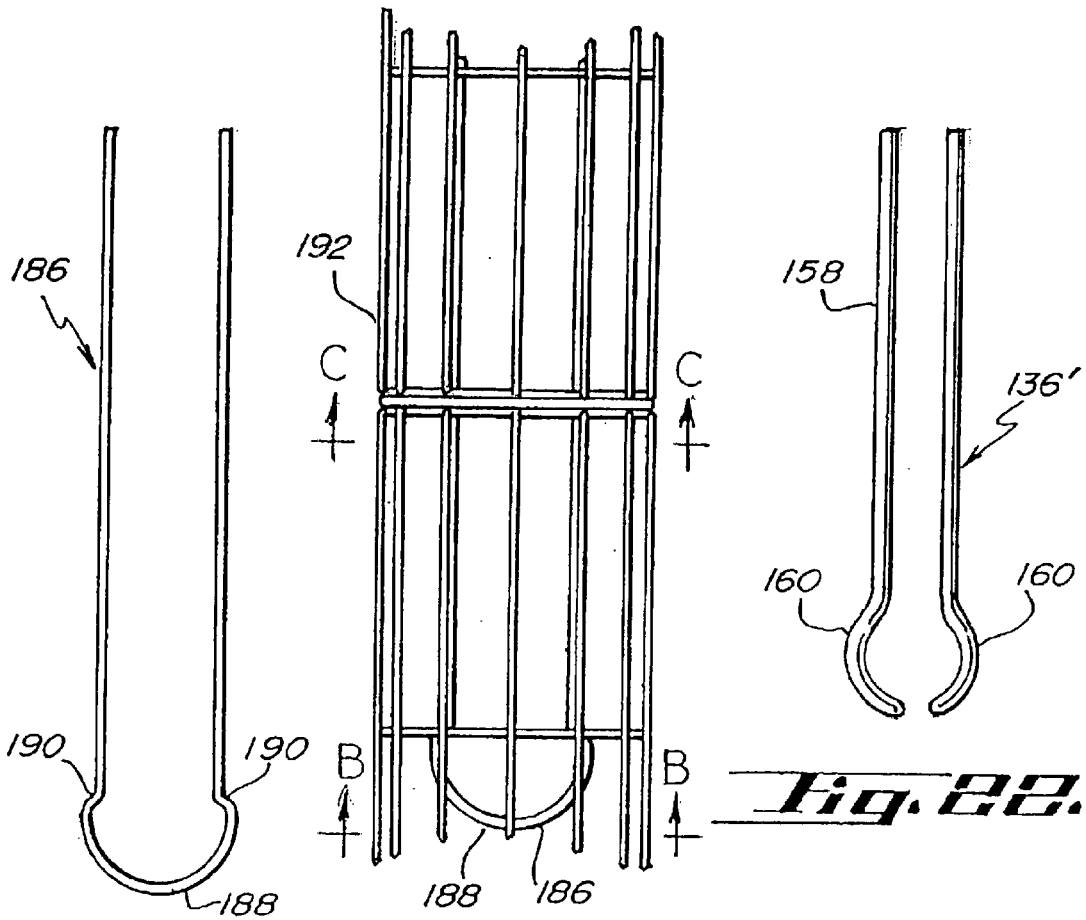
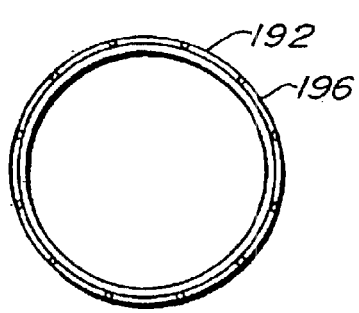
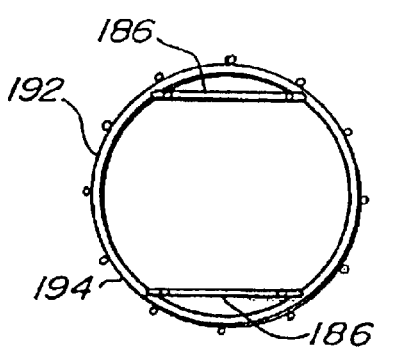

WIRE FILTER CAGE

CROSS-REFERENCE TO RELATED APPLICATIONS

The current application is a continuation of U.S. patent application Ser. No. 10/645,859 filed on Aug. 21, 2003, entitled "Wire Filter Cage," now U.S. Pat. No. 6,790,250, which is a continuation of U.S. patent application filed on Dec. 31, 2001, entitled "Wire Filter Cage" having Ser. No. 10/137,319, now U.S. Pat. No. 6,626,970, which claims the benefit of U.S. Provisional Application No. 60/258,674, filed Dec. 29, 2000, and U.S. Provisional Application 60/295,333, filed on Jun. 1, 2001, all of which are hereby incorporated herein in their entirety by reference.

FIELD OF THE INVENTION

The present invention relates to an air filtration system suitable for use within the ventilation system of a building. More particularly, the invention relates to improved filter cages used for supporting elongated filtration bags or socks within such a filtration system.

BACKGROUND OF THE INVENTION

Air filtration systems utilized in large ventilation systems often employ banks of elongated filtration bags or socks supported by wire filter cage assemblies. The filtration bags are positioned over the filter cages and remove particulates from the air circulated through the bag. The wire filter cages support the bags and prevent the bags from collapsing as air is drawn through the bags. Filter media exclude particulates from passing through the bag along with the air, and the particulates accumulate on the outside of the bags as air is drawn through the bag and filter cage combination.

Wire filter cages supporting filtration bags are commonly used in large-scale filter assemblies. A large-scale filter assembly structure includes a large enclosure. The large enclosure is divided by a horizontal partition plate that separates an upper clean air compartment from a lower dirty air compartment. The partition plate is formed with a large number of openings arranged in a pattern. Each such opening supports a wire filter cage and its associated fabric filter bag. Thus, the air flow passes from the lower dirty air compartment through the suspended filter bags and wire filter cages through the openings in the partition plate and into the upper clean air compartment.

Filter bags are periodically cleaned by shaking or by creating a backflow of air from the inside of the filter bags outward. After an extended period of use it becomes necessary to remove the filter cages and filter bags from the partition plate in order to replace the filter bags. If a one-piece filter cage is employed it is necessary that the upper clean air compartment have sufficient overhead height for the entire length of the filter cage to be accommodated. Wire filter cages can be as long as 26 feet. Thus, it is preferred, with lengthy filter cages, that the filter cages be partitioned into two or more sections to allow for a shorter overhead height in the clean air compartment. This shorter overhead height can result in large cost savings in material and construction of large filter assemblies.

Fine dust can form an explosive mixture with air. Dust collectors are thus vented to prevent an accumulation of fine dust. Larger collector volume requires a greater vent area. A reduction in overhead height and consequently volume in the upper compartment leads to a lower venting cost and associated operating cost.

A variety of techniques have been used to connect multiple sections of wire filter cages. Wire filter cage section connections should be secure and easily assembled and disassembled, preferably without tools. In addition, it is desirable that the inner connections be made without leaving any exposed wire ends or other sharp. Fabric filter bags are relatively vulnerable. If they are snagged on exposed wire ends they may be torn thereby causing particulate leaks and requiring replacement of the bags sooner than would otherwise be necessary.

It is also desirable that wire filter cage sections be assembled without the need for fine motor dexterity. Workers replacing filter bags and handling wire filter cages wear heavy protective clothing including heavy gloves to protect them. Thus, it would be beneficial if wire filter cage sections could be assembled and disassembled without the need for fine manipulation.

U.S. Pat. Nos. 5,173,098 and 3,747,307 are example of wire filter cage assemblies having exposed ends that may tear filter bags. Other prior art approaches also may expose wire ends, which may cause damage to fabric filter bags.

The approach to connecting wire filter cage sections disclosed in U.S. Pat. No. 5,173,098, issued to Pipkorn, reveals a connection technique utilizing two sheet metal sleeves and two wire clips. This approach provides a secure interconnection that is relatively easy to assemble and disassemble, however it utilizes two sheet metal sleeves which add expense and two wire clips which require relatively fine manipulation to connect. In addition, the presence of the two sheet metal sleeves reduces the surface area available for filtration by inhibiting air flow.

It would be desirable to have a multi-section wire filter cage that can be easily assembled and disassembled without the need for tools, and that minimized potential damage to fabric filter bags from exposed wire ends. Further it is desirable that the wire filter cage that could be easily manipulated by gloved hands.

SUMMARY OF THE INVENTION

The present invention in large measure solves the above-indicated problems by providing a new structure and technique for connecting wire filter cage sections. The present invention includes formed wire guides to create a snap latch joint. The wire guides protrude from the interior of a first wire filter cage section. The wire guides are inserted into the open end of a second wire filter cage section to join the sections. When the two sections are assembled together on a common axis, the resistance to bending of the wire guides presses the ends of the wire guides against the annular rings of the second wire filter cage, thus aligning the two cages axially and holding the two cages snugly together.

The present invention reduces the overall costs of assembling wire filter cage joints by elimination of sheet metal sleeves. Better welds may be achieved and there is no need for arc welding of the joints. The ability to use resistance welding equipment to assemble the joints eliminates the need for buffing of welding flash thereby reducing cost. The wire guides do not need adjustment of the spread of these assemblies prior to assembling wire filter cage sections. The use of wire guides also eliminates the need for any additional latching or any retaining assembly in the joint.

BRIEF DESCRIPTION OF THE DRAWINGS

FIG. 8 is a plan view of an alternate embodiment of a wire guide in accordance with the present invention;

FIG. 9 is an elevational view of the wire guide depicted in FIG. 8;

FIG. 10 is a plan view of another embodiment of a wire guide in accordance with the present invention;

FIG. 11 is a detail view of the wire guide depicted in FIG. 10 and depicting grip angle and grip range;

FIG. 12 is a partial elevational view of a wire filter cage including two wire guides;

FIG. 13 is a sectional view of a wire filter cage including two wire guides;

FIG. 14 is a plan view of an alternate serpent head embodiment in accordance with the present invention;

FIG. 15 is a plan view of an alternate arrowhead embodiment of the present invention;

FIG. 16 is an elevational view of the arrowhead embodiment depicted in FIG. 15;

FIG. 17 is a plan view depicting alternate angular embodiments of the arrowhead embodiment of the invention;

FIG. 18 is a plan view of another embodiment of the wire guide adapted for use with circular filter cages;

FIG. 19 is a partial plan view of two circular filter cage sections joined with the wire guide embodiment of FIG. 18;

FIG. 20 is a sectional view taken along section line BB of FIG. 19;

FIG. 21 is a sectional view taken along section line CC of FIG. 19;

FIG. 22 is an alternate embodiment of the wire guide depicted in FIG. 10;

DETAILED DESCRIPTION OF THE INVENTION

Figure 1:
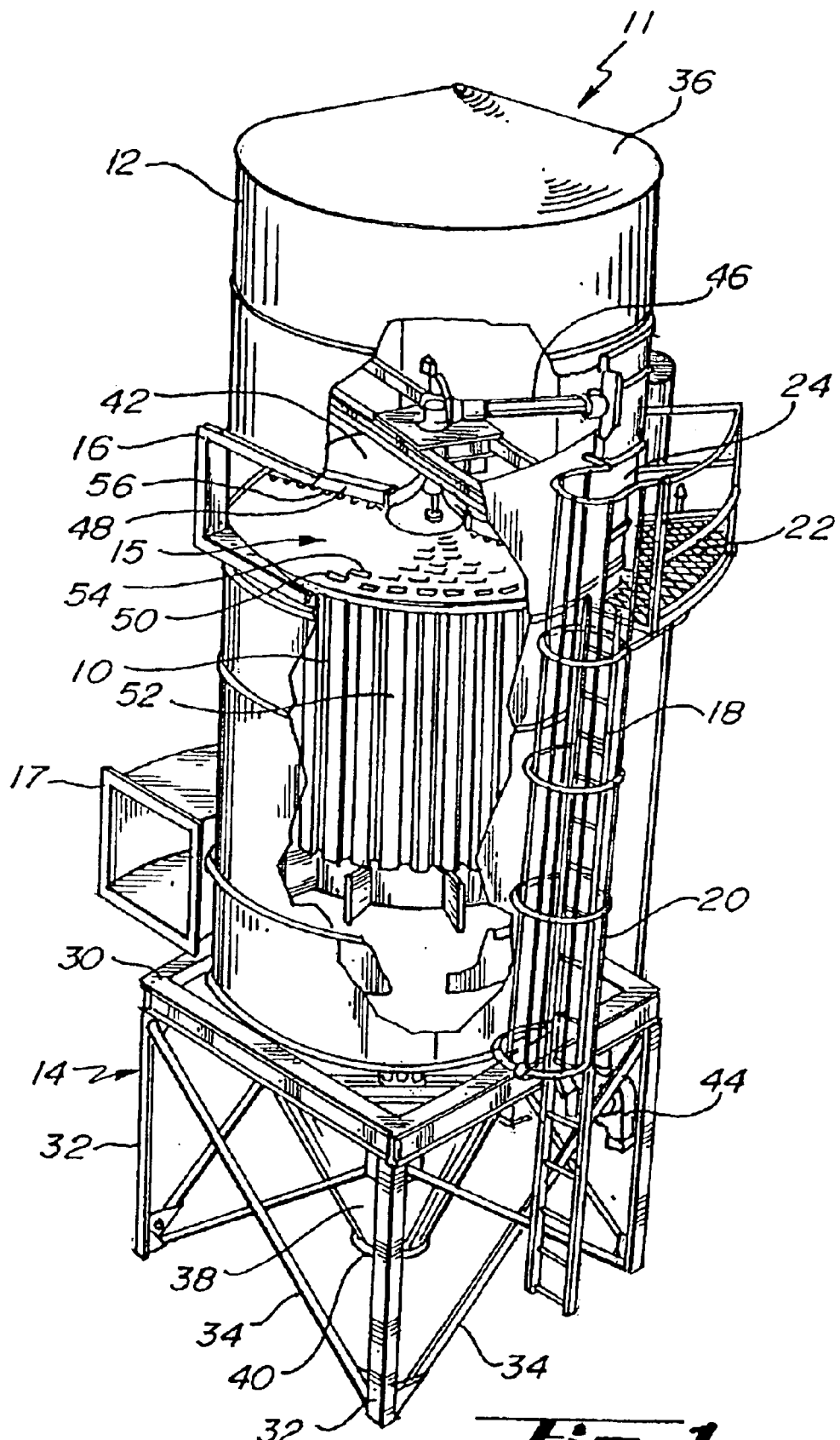
FIG. 1 is a cutaway perspective view of a large-scale filter assembly that can utilize a plurality of wire filter cages in accordance with the present invention.

Referring to FIG. 1, a plurality of filter elements are depicted as installed in an air filtration unit 11. The air filtration unit 11 broadly includes plenum enclosure 12, base frame 14, air filtration assembly 15, filtered exhaust duct 16, and air intake duct 17. Air filtration unit 11 is utilized, for instance, in power or nuclear plants, coal dumping facilities, grain handling facilities and buildings where refining operations may take place. Typical ventilation systems used in these environments may range in height from fifty to one hundred feet. An access ladder 18, surrounded by safety cage 20, leads up to catwalk 22, providing access to plenum enclosure 12 through access door 24. Filtered exhaust duct 16 and air intake duct 17 may be attached to and integral with plenum enclosure 12. Air filtration assembly 15 is positioned within plenum enclosure 12. Plenum enclosure 12 is positioned on base frame 14.

Base 14 may include frame 30, legs 32, and braces 34. Base 14 may vary in size and proportion, depending on the size of the plenum enclosure 12 to be supported on base 14. Base 14 can be made of a variety of high strength, durable materials such as structural steel. Those of skill in the art will recognize that a variety of materials may be employed without departing from the scope of the present invention.

Plenum enclosure 12 may be a large, generally cylindrical structure, ranging from twenty-five to fifty feet in height. Plenum cover or roof 36 is positioned over plenum enclosure 12. Dust collection funnel 38 tapers downwardly toward dust discharge mouth 40. The funnel 38 is positioned underneath plenum enclosure 12, residing within the space below base frame 30 and between legs 32 and braces 34.

The air filtration assembly 15 is contained mainly within plenum chamber 42. Air filtration assembly 15 comprises an air pressure pump 44, pressurization nozzle input duct 46, nozzle arm 48, and numerous filter elements 50 having air permeable hanging filter media bags or socks 52 surrounding filter cages 54. In a typical large capacity air handling system, often employing multiple air filtration units 11, as many as twenty thousand filter bags 52 and twenty thousand wire filter cages 54 may be utilized. Air pressure pump 44 is connected to nozzle duct 46. Nozzle arm 48 is positioned beneath nozzle duct 46, and has suction nozzles 56 opening in a downwardly direction, directed toward bag mouths 58 of filter elements 50.

Filter media bags or socks 52 are attached to bag mouths 58. Bag mouths 58 are positioned below bag nozzles 56. Bag mouths 58 rest on and are supported by bag hanger deck 62.

Filter media bags 52 are positioned over and supported by wire filter cages 54. Unfiltered air enters air filtration unit 11 through intake duct 17 so as to be processed through air filtration assembly 15. Filtered air is expelled from air filtration unit 11 through filtered exhaust duct 16.

Figure 2:
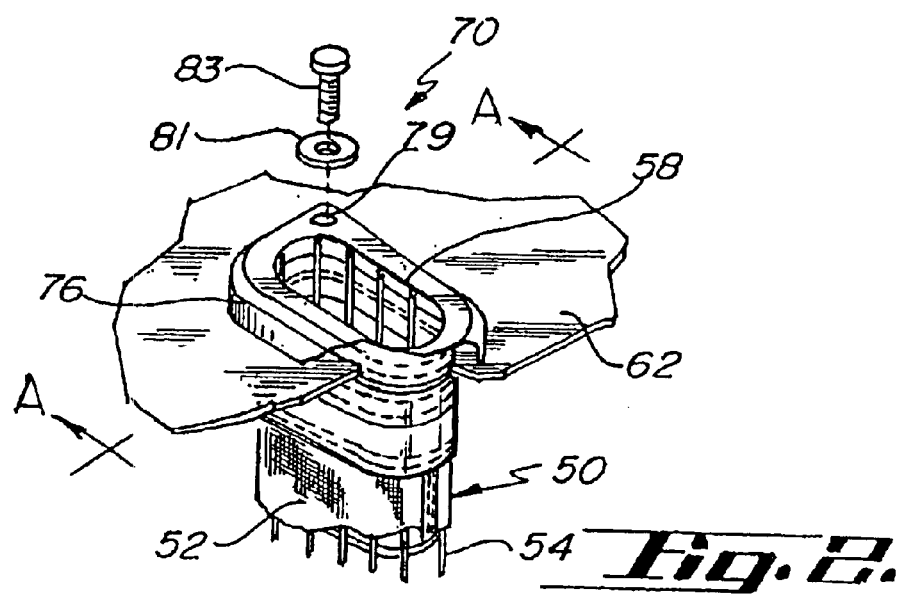
FIG. 2 is a partial perspective view illustrating the fastening of a filter element within a filter assembly.
Figure 3:
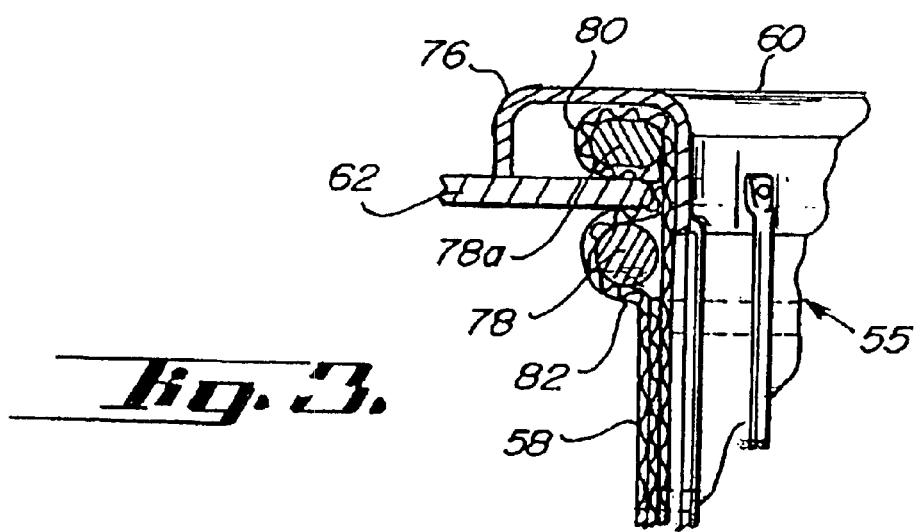
FIG. 3 is a partial, side sectional view taken along line AA of FIG. 2.

Referring now to FIGS. 2 and 3, filter element 55 is shown ready for fastening to hangar deck 62. Bag mouth 58 and filter bag 52 may be held in position against bag hanger deck 62 by O-rings 78, 78a which are positioned inside over-deck bead 80 and under-deck bead 82 of bag 52. O-rings 78, 78a snap into place so as to restrain filter bag 58 and provide a tight seal, so that no particulate or filtered matter enters plenum chamber 42. Bag mouth 60 is securely fastened to bag hanger deck 62 through mounting hole 79 using washer 81 and bolt 83.

Figure 4:
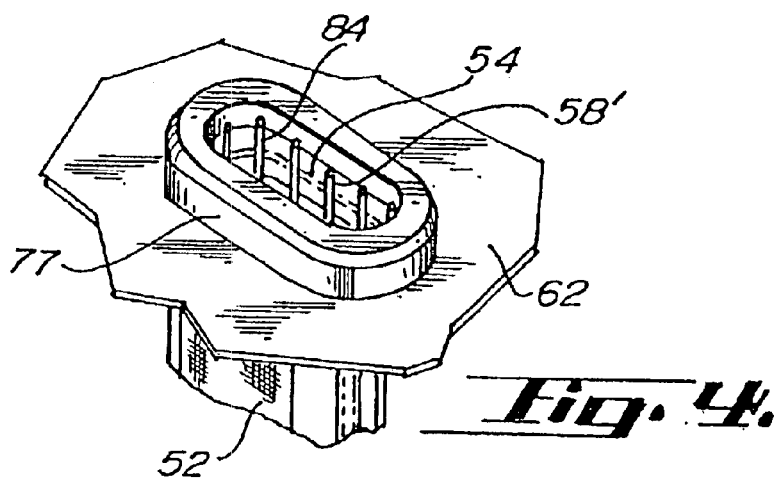
FIG. 4 is a partial perspective view illustrating an alternative fastening of a filter element within a filter assembly.

Referring now to FIG. 4, another embodiment of bag mouth 58' is illustrated. In FIG. 4, bag mouth 58' is positioned on filter cage 54 such that longitudinal wires 84 terminate below the surface of mouth rim 77. Bag mouth 58' is positioned on bag hanger deck 62, and is simply pressed into place and engages with bag hanger deck 62 by friction. No bolt is utilized to hold bag mouth 58' to bag hanger deck 62.

Thus a ventilation system 11 includes a plurality of filter elements 50. Each filter element includes a filter cage 54 and a filter bag 52. As will be appreciated, the filtration unit 11 depicted in FIG. 1 can accommodate conventional filter units, filter units in accordance with the present invention, or a combination of conventional filter units and units in accordance with the present invention.

Figures 5, 6, 7:
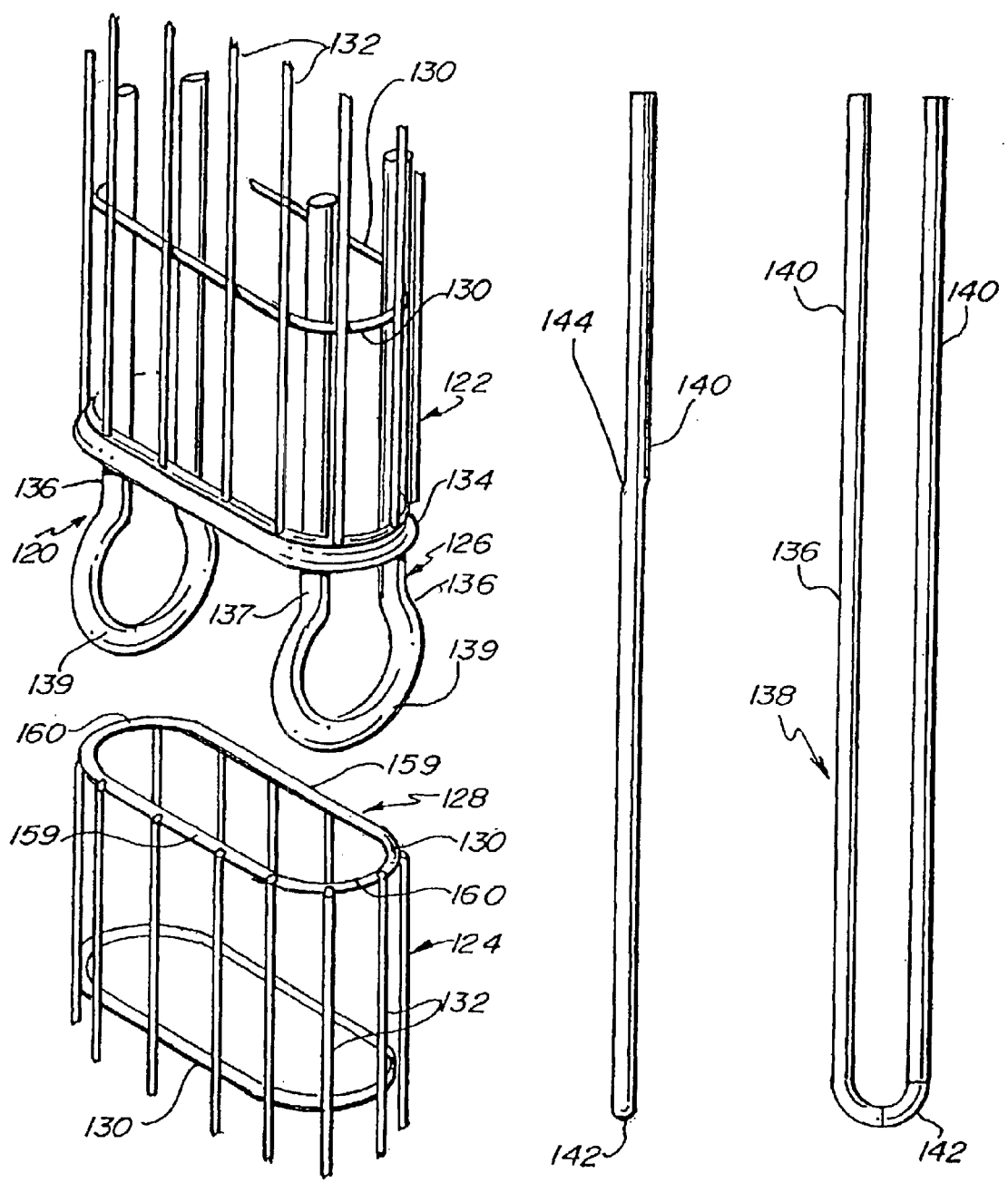
FIG. 5 is a perspective view of two sections of a wire filter cage in accordance with the present invention.
FIG. 6 is a plan view of one embodiment of a wire guide in accordance with the present invention.
FIG. 7 is an elevational view of the wire guide depicted in FIG. 6.

Referring to FIG. 5, an improved wire filter cage 120 in accordance with the present invention includes a first section 122 and a second section 124. First section 122 presents a male end 126 and second section 124 presents a female end 128. Each section 122, 124 includes a plurality of circular or oval form wires 130 connected by a plurality of generally parallel longitudinal wires 132. First section 122 may further include a large junction form wire 134 at the end thereof. First section 122 includes two guides 136 presenting male end 126 adapted to be received into female end 128 of second section 124. Wire guides 136 can be made out of wire or another suitable material having sufficient elastic memory to return to a relaxed state after deformation.

Each wire guide 136 includes a pair of generally parallel legs 137, and a circular end 139. As can be seen in FIG. 5, the wire guides 136 are positioned at opposed ends of the generally race track in cross-section wire filter cage section 122.

Wire guides 136, form wires 130 and longitudinal wires 132 are preferably joined by resistance welding though other joining methods may be employed. Whatever joining method is employed, it is desirable that the finished product be smoothly finished to prevent snagging or damage to filter bags 52.

Generally, a wire filter cage 120 will be formed of metal wires. However, it is specifically contemplated that the invention disclosed here may be used with any type of filter cage or filter support. Examples include but are not limited to filter cages made from plastics, composites and perforated sheet materials.

Referring to FIG. 5, in operation, wire filter cages 120 are assembled from a first section 122 and a second section 124 by aligning the first section 122 and the second section 124 coaxially and pressing the two sections together. In the assembly process, as depicted in FIGS. 5 and 13, wire guides 136 engage form wires 130 to secure the joint. In this embodiment of the invention wire guides 136 engage form wires 130 primarily by friction and outward biasing force.

A worker disassembling a wire filter cage 120 generally works from above the wire filter cages 120. The worker lifts a wire filter cage 120 to expose the entire length of first section 122 and secures second section 124 to prevent it from falling. The worker then grasps first section 122 and pulls parallel to the longitudinal axis thereof, in order to overcome the retaining force created by wire guides 136. Once the retaining force is overcome, first section 122 and second section 124 separate. Second section 124 is then lifted from its position below the worker. If a wire filter cage 120 employs more than two sections, the disassembly process is repeated for each succeeding pair of sections.

Referring to FIGS. 6 and 7, an alternative embodiment of wire guide 138 is depicted. Hairpin wire guide 138 is preferably formed of a single piece of stiff resilient wire and has two generally parallel legs 140 and a semicircular end 142. Semicircular end 142 is of the same diameter as the separation of legs 140. Referring to FIG. 7, hairpin wire guide 138 may further include offset 144. Forming will generally be accomplished by bending but may also be accomplished by other techniques.

Hairpin wire guide 138 provides ease of assembly and disassembly but is limited to applications requiring primarily alignment and a low retention force. It displays relatively low weak side axial stability.

FIGS. 8 and 9 depict another embodiment of wire guide 146. Rabbit ear wire guide 146 generally includes parallel leg segment 148, diverging leg segment 150 and rounded end 152. Referring to FIG. 9, rabbit ear wire guide 146 may further include offset 154.

In operation, rabbit ear wire guide 146 is engaged and disengaged in a similar manner to hairpin wire guide 138. Rabbit ear wire guide 146 provides a somewhat greater frictional retentive force than hairpin wire guide 138 due to the diverging nature of diverging leg segments 150.

Referring to FIG. 10, the embodiment of wire guide 136 is depicted in greater detail. Keyhole wire guide 136 includes generally parallel legs 137 and circular end 139. The arc of circular end 139 extends to greater than about one hundred eighty degrees and less than about 300 degrees. Circular end 139 forms a retaining head.

FIG. 11 shows further detail of wire guide 136. Wire guide 136 presents a grip angle 162 and a grip range 164. Grip range 164 extends from closed joint ideal location 166 to acceptable joint location 168. Wire guide 136 may also be modified into another embodiment 136' as depicted in FIG. 22 by removing a portion of the wire at the end of circular end 160.

Again referring to FIG. 5, female end 128 of second section 124 comprises a generally race track shaped wire 130 having opposed parallel sides 159, and opposed generally circular ends 160. The diameter of the retaining head 139 is sized such that it can be received between the two parallel sides 137 of wire 130 of female end 128 of section 124, but can be snapably retained within its respective form wires 130 of female end 128. As can also be seen FIG. 5, the wire guides 136 are positioned in first section 122 such that the retaining heads 139 are received within the form wires 130 of female end 128 of second section 124, when the two sections are joined together. Because the retaining heads 139 are of a larger diameter than the distance between the sides of form wire 130 of female end 128 of the second section 124 at their initial contact point, the retaining heads 139 are urged inwardly as the two sections are pushed together, where the distance between the wires 159 is greater, and then received through the female end 128. Once received through the female end 128, the retaining heads 139 snap outwardly behind form wire 130, thus engageably retaining the first section 122 with the second section 124.

Note that a cross sectional view of any wire filter cage 120 has at least a first width and a second width. Even a circular cross section has a greatest chord which is the diameter and a plurality of lesser chords all of which are less in linear dimension than the greatest chord. The guides of the present invention all have significant memory, such that, when urged out of their rest position they are biased to return to the rest position. When the wire guides 136, for instance, of first section 122 are inserted into second section 124, form wires 130 of second section 124 urge the wire guides 136 towards each other. Once the semicircular head 139 is received past the form wire proximate the female end 128 of section 124, the guides 136 are urged back to their rest position and snapably couple the first and second sections together. The other embodiments act in a similar manner.

FIG. 14 depicts another embodiment of wire guide 136 as employed in the present invention. Serpent head wire guide 170 includes serpent shaped head 172 and generally parallel legs 173. Serpent shaped head 172 presents a widening taper 174 followed by a narrowing taper 175.

In operation, serpent head wire guide 170 is operated in a manner similar to the foregoing embodiments. The serpent head wire guide 170 displays ease of insertion because of widening taper 174 and a retention force similar to keyhole wire guide 156 because of narrowing taper 175. The serpent head wire guide 170, however, requires more complex tooling to manufacture.

As depicted in FIG. 15 arrowhead wire guide 176 generally includes arrowhead shaped head 178 and generally parallel legs 179. Arrowhead wire guide 176 presents shallow widening taper 180 and steep narrowing taper 181. Arrowhead wire guide 176 may also include offset 182 as depicted in FIG. 12. Referring to FIG. 17, Arrowhead wire guide 176 may be constructed with a variety of arrowhead angles 184. A variety of angles 184 similarly may also be applied to serpent head wire guide 170.

In operation, arrowhead wire guide 176 is operated in a manner similar to the foregoing embodiments. The arrowhead wire guide 176 displays ease of insertion and a retention greater than keyhole wire guide 156 because of shallow widening taper 180 and steep narrowing taper 181. The arrowhead wire guide, however, requires more complex tooling to manufacture.

Referring to FIGS. 18 through 21, another embodiment of the wire guide 186 is depicted. This embodiment of the wire guide 186 is particularly well adapted for use with wire filter cages 192 of circular cross section. Those skilled in the art will recognize that the cage may take many different arcuate or polygonal cross-sections without departing from the scope of the present invention. FIGS. 19, 20 and 21 depict wire guide 186 as utilized with wire filter cages 192 of circular cross section.

Figure 24:
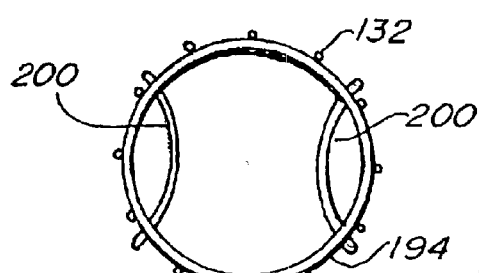
FIG. 24 is a sectional view of a wire filter cage assembly utilizing an alternate embodiment of a wire guide.

Referring to FIG. 24, an alternative embodiment of wire guide 186' is depicted. Guide wire 186' is similar to guide 186, but includes additional curvatures. In this embodiment the head or end of the wire guide 186' includes curve 200 such that the wire guide 186' contacts form wire 130 in an approximately radial orientation. Wire guide 186' further includes engagement portion 194, arcuate portion 196 and curve 200.

Figure 25:
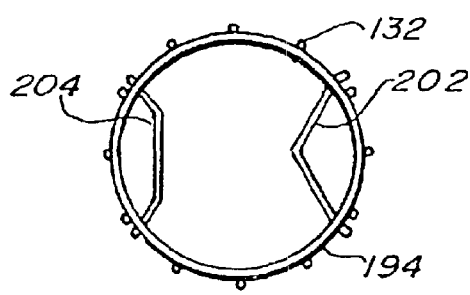
FIG. 25 is a sectional view of a wire filter cage assembly utilizing two alternate embodiments of the wire guide.
Figure 26:
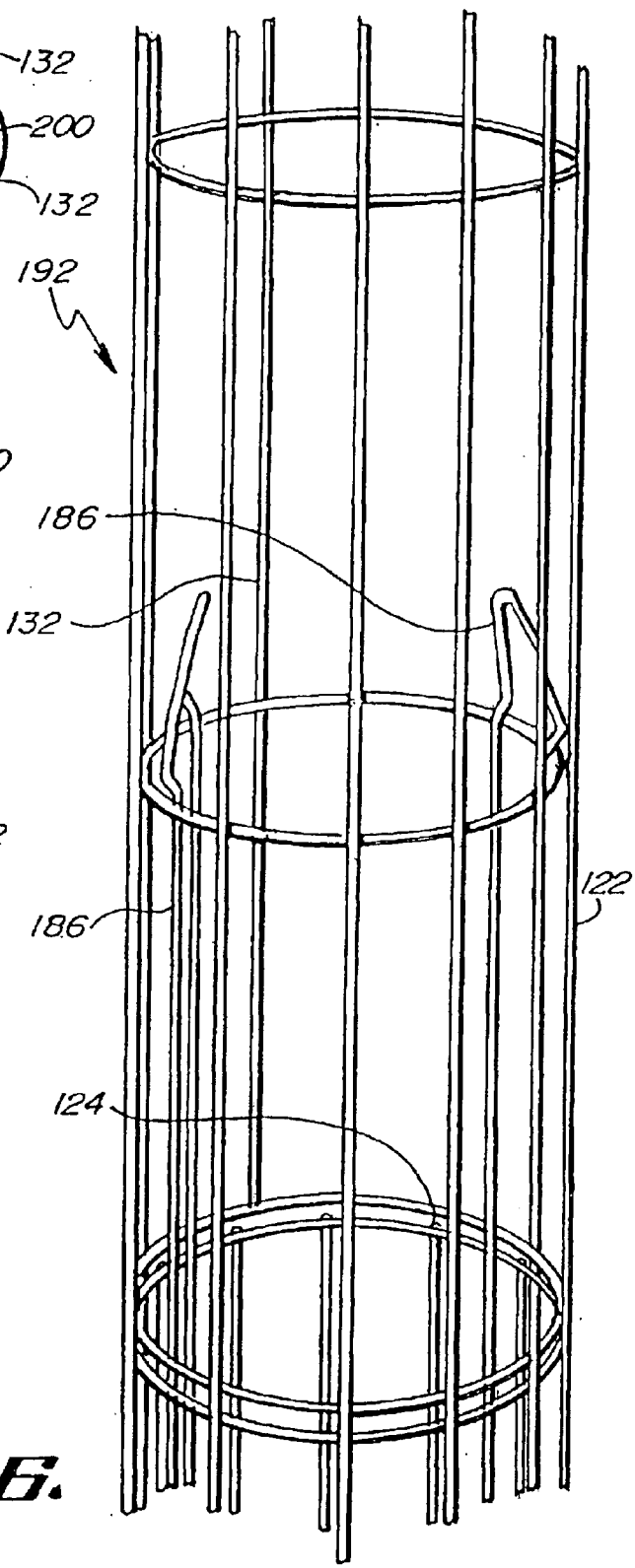
FIG. 26 is a perspective view of a wire filter cage assembly utilizing the embodiment of the wire guide depicted in FIG. 24.
Figure 27:
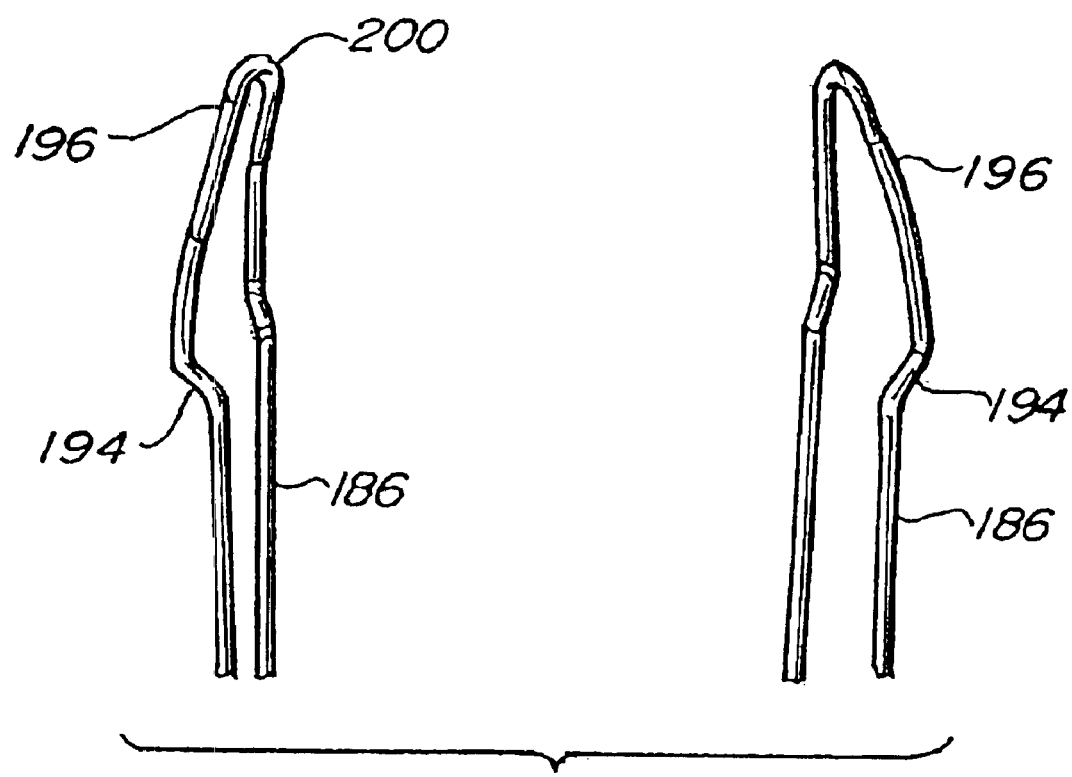
FIG. 27 is a perspective view of the wire guide depicted in FIG. 24.
Figure 28:
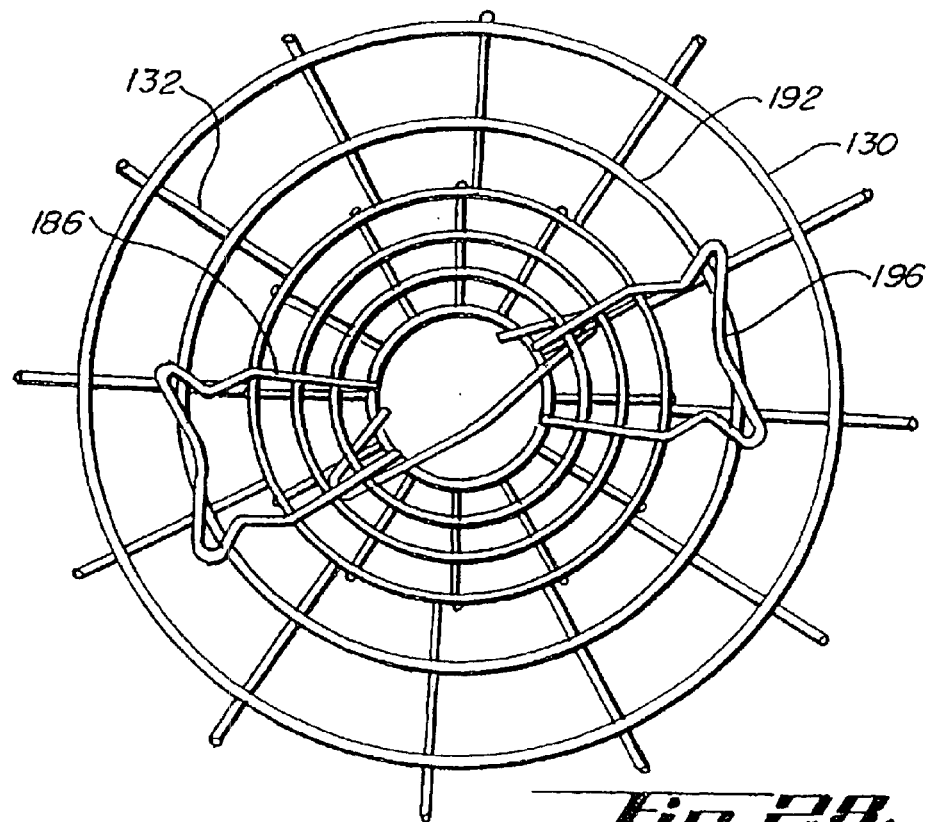
FIG. 28 is a perspective view of a wire filter cage assembly utilizing the embodiment of the wire guide depicted in FIG. 24.
Figure 29:
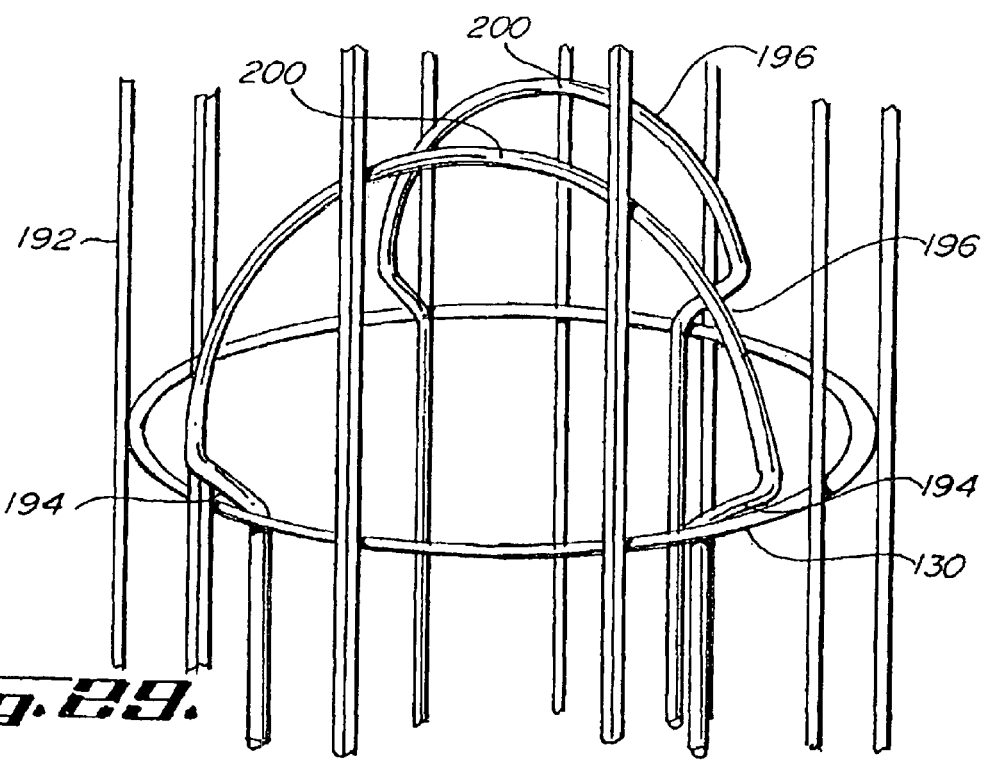
FIG. 29 is a perspective view of a wire filter cage assembly utilizing the embodiment of the wire guide depicted in FIG. 24.

Curve 200 may be applied to any of the previously described hairpin wire guide 138, rabbit ear wire guide 146, keyhole wire guide 156, serpent head wire guide 170, arrowhead wire guide 176 or circular cage wire guide 186. FIG. 24 depicts curve 200 as applied to circular cage wire guide 186'. Referring to FIG. 25 curve 200 may be replaced with bend 202 or double bend 204. Other configurations will be readily appreciated by those skilled in the art and the illustrated embodiments should not be considered to be limiting. FIGS. 26, 27, 28 and 29 further depict curve 200 as applied to circular cage wire guide 186'.

It is noted that resistance to bending of the wire guides is a major factor in joint retention force. Grip angle is a smaller factor. Regardless of the shape of the wire guide employed, when assembled the wire guide grips a form wire 130 of female end 128 of second section 124. The retention force of wire guides is a function of the spring constant of the wire, the preset width separating the two wire guides in a joint and the outside dimension of the retention head of the wire guide. The spring constant depends upon the diameter and metallurgical qualities of the wire employed.

Referring to FIG. 11, grip range 164 extends from closed joint ideal location 166 to acceptable joint location 168. Grip angle 162 provides a force tending to hold the connection between first section 122 and second section together even if the wire guide is not engaged with form wire 130 to the closed joint ideal location 166.

Figure 23:
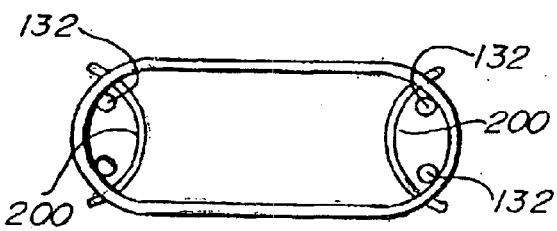
FIG. 23 is a sectional view of a wire filter cage assembly utilizing an alternate embodiment of a wire guide.

Referring to FIGS. 23 and 24, it is notable that in embodiments of the wire guide including curve 200, the retention force of the wire guide is enhanced because the force vector created by the spring action is directed more nearly normal to form wires 130 than wire guides without curve 200. As depicted in FIG. 25, it is noted that wire guide can be formed in other ways to acquire the desired angle of contact between wire guide and form wires 130. These are specifically contemplated to be embodiments of the present invention.

The multi-sectional nature of the filter cage 120 hereof, and in particular the ease and reliability with which the sections can be snapped together and pulled apart, facilitate the conservation of space within filter housings. Because the length of the sections is less than the length of the whole, the upper, clean portion of filter housings can be reduced in height.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A method of joining and unjoining sections of a filter membrane support structure having a first section and a second section, the first section having a first longitudinal axis and the second section having a second longitudinal axis, the method comprising the steps of:
    positioning the first section of the support structure, the first section having a cross section, said cross section presenting a first width and a second width spaced apart from said first width, the second width being less than the first width and presenting a path of travel therebetween;
    aligning a second section of the support structure so that the first longitudinal axis and the second longitudinal axis are substantially axially aligned, the second section of the support structure including a glide member having opposed elements, the opposed elements being resiliently receivable within the cross section and the opposed elements being biased toward the first width;
    advancing the second section and the first section toward one another so that the opposed elements are resiliently deformed and then resiliently return toward the first width thereby joining the first section to the second section.

2. The method as claimed in claim 1, further comprising the step of applying a covering filter medium over the first section and the second section.

3. The method as claimed in claim 1, in which the first section comprises circumferential members defining the cross section thereof and further comprising the step of inserting the opposed elements of the second section inside of at least one of the circumferential members.

4. The method as claimed in claim 3, further comprising the step of snapably engaging the opposed elements with at least some of the circumferential members.

5. The method as claimed in claim 3, further comprising the step of selecting a shape of said circumferential members from a group consisting of circular, oval, elliptical and polygonal.

6. The method as claimed in claim 1, further comprising the step of selecting a shape of the guide member opposed elements from a group consisting of rabbit ear shaped, keyhole shaped, serpent head shaped, arrowhead shaped, hairpin shaped and loop shaped.

7. The method as claimed in claim 1, further comprising the step of applying a pulling force generally along said first and second longitudinal axes, the force overcoming engagement of the guide member with the first section to unjoin the first section and the second section.

* * * * *